United States Patent
Okayasu et al.

(10) Patent No.: US 7,670,047 B2
(45) Date of Patent: Mar. 2, 2010

(54) EXHAUST GAS TEMPERATURE SENSOR INSPECTING APPARATUS

(75) Inventors: Kouji Okayasu, Saitama (JP); Yoshinori Ishihara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 200 days.

(21) Appl. No.: 11/822,424

(22) Filed: Jul. 5, 2007

(65) Prior Publication Data
US 2008/0019414 A1  Jan. 24, 2008

(30) Foreign Application Priority Data
Jul. 6, 2006 (JP) ............... 2006-186499

(51) Int. Cl.
*G01N 3/60* (2006.01)
(52) U.S. Cl. .................. 374/57; 374/1
(58) Field of Classification Search .......... 374/1, 374/57, 144; 73/114.41
See application file for complete search history.

(56) References Cited

U.S. PATENT DOCUMENTS

| | | | | |
|---|---|---|---|---|
| 5,153,835 A | * | 10/1992 | Hashimoto et al. | 701/114 |
| 6,684,154 B2 | * | 1/2004 | Isobe et al. | 701/114 |
| 2003/0009276 A1 | * | 1/2003 | Isobe et al. | 701/114 |
| 2004/0184507 A1 | * | 9/2004 | Tsukamoto et al. | 374/57 |
| 2005/0102076 A1 | | 5/2005 | Kariya et al. | |

FOREIGN PATENT DOCUMENTS

| | | |
|---|---|---|
| EP | 0 831 222 A2 | 3/1998 |
| EP | 1 273 781 A2 | 1/2003 |
| JP | 59-120835 | 7/1984 |
| JP | 2006316722 A * | 11/2006 |
| WO | 02/73146 A1 | 2/2002 |

* cited by examiner

*Primary Examiner*—Andre J Allen
(74) *Attorney, Agent, or Firm*—Arent Fox LLP

(57) ABSTRACT

A temperature sensor disposed in an exhaust system of an engine is inspected. Determination is made that conditions for inspecting the temperature sensor are satisfied in the current engine load range. The time for the temperature in the exhaust system to reach a value appropriate for checking the temperature sensor is determined in accordance with engine water temperature. Output of the temperature sensor is checked to determine if the temperature sensor is normal at the determined time.

13 Claims, 5 Drawing Sheets

EXHAUST GAS TEMPERATURE SENSOR INSPECTING APPARATUS

BACKGROUND OF THE INVENTION

The present invention relates to an apparatus for inspecting a temperature sensor disposed in an exhaust system of an internal combustion engine.

The ability of a catalyst of a catalytic converter installed in an exhaust system of a vehicle may decrease if the catalytic converter is exposed to an abnormally high temperature. In order to control the temperature of the catalyst, a temperature sensor is usually disposed in the vicinity of the catalyst. This temperature sensor generally uses a thermistor having lower resistance at higher temperature. The value of resistance becomes larger as the temperature becomes lower.

The Japanese Patent Application Publication No. S59-120835 discloses a technique for detecting breaking of a temperature sensor by providing a second reference power supply for generating a second voltage signal different from a voltage signal from the temperature sensor at a normal time. The second voltage signal is compared with the voltage signal from the temperature sensor.

In case of a diesel engine, the temperature of the exhaust gas is relatively low. If an inspection for a temperature sensor is performed under a condition that a temperature of an exhaust system is low, for example, immediately after the engine starts, the sensor may produce a fixed output value due to the low temperature even if the temperature sensor is normal, which may lead to a wrong detection that the sensor is in a failure.

Thus, there is a need for a temperature sensor inspecting technique that does not produce a wrong detection.

SUMMARY OF THE INVENTION

In order to solve the above-described problem, the present invention provides an apparatus for inspecting a temperature sensor disposed in an exhaust system of an engine. A temperature sensor disposed in an exhaust system of an engine is inspected. Determination is made that conditions for inspecting the temperature sensor are satisfied in the current engine condition. The time for the temperature in the exhaust system to reach a value appropriate for checking the temperature sensor is determined in accordance with engine water temperature. Output of the temperature sensor is checked to determine if the temperature sensor is normal at the determined time.

According to one aspect of the invention, determination is made that conditions for inspecting the temperature sensor are satisfied in the current engine condition. The time when the temperature in the exhaust system reaches a value appropriate for checking the temperature sensor is determined. When the time elapsed with satisfying conditions, the output of the temperature sensor is checked to determine if the temperature sensor is normal.

Further, a load range is selected according to the engine water temperature, wherein a higher load range is selected the lower the engine water temperature is. The load range is used in determining the above-mentioned time.

According to the invention, the output of the temperature sensor is inspected when the conditions for permitting the inspection, selected in accordance with the engine water temperature, are satisfied over a time period as determined by the engine water temperature. Under such conditions, it is expected that the exhaust gas temperature has left a state of a low temperature and risen to a temperature appropriate for checking the temperature sensor where the temperature sensor has left a state of producing a fixed value and produces varying output according to the temperature. Therefore, normality of the temperature sensor can be determined by checking the temperature sensor output under such conditions.

According to one aspect of this invention, a lower engine load range is selected the higher the engine water temperature is.

According to this aspect, the detection frequency may be increased because the conditions for inspecting the temperature sensor are satisfied even in a low engine load range when the engine water temperature is high.

According to another aspect of the invention, the engine is a diesel engine and the temperature sensor is disposed upstream of an oxidizing catalyst or is disposed at an entrance of a diesel particulate filter (DPF).

According to this aspect, failure of the temperature sensor may be accurately determined. Accurate determination of the failure is required for maintenance of the particulate filter of the diesel engine.

DESCRIPTION OF THE PREFERRED EMBODIMENTS

Figure 1:
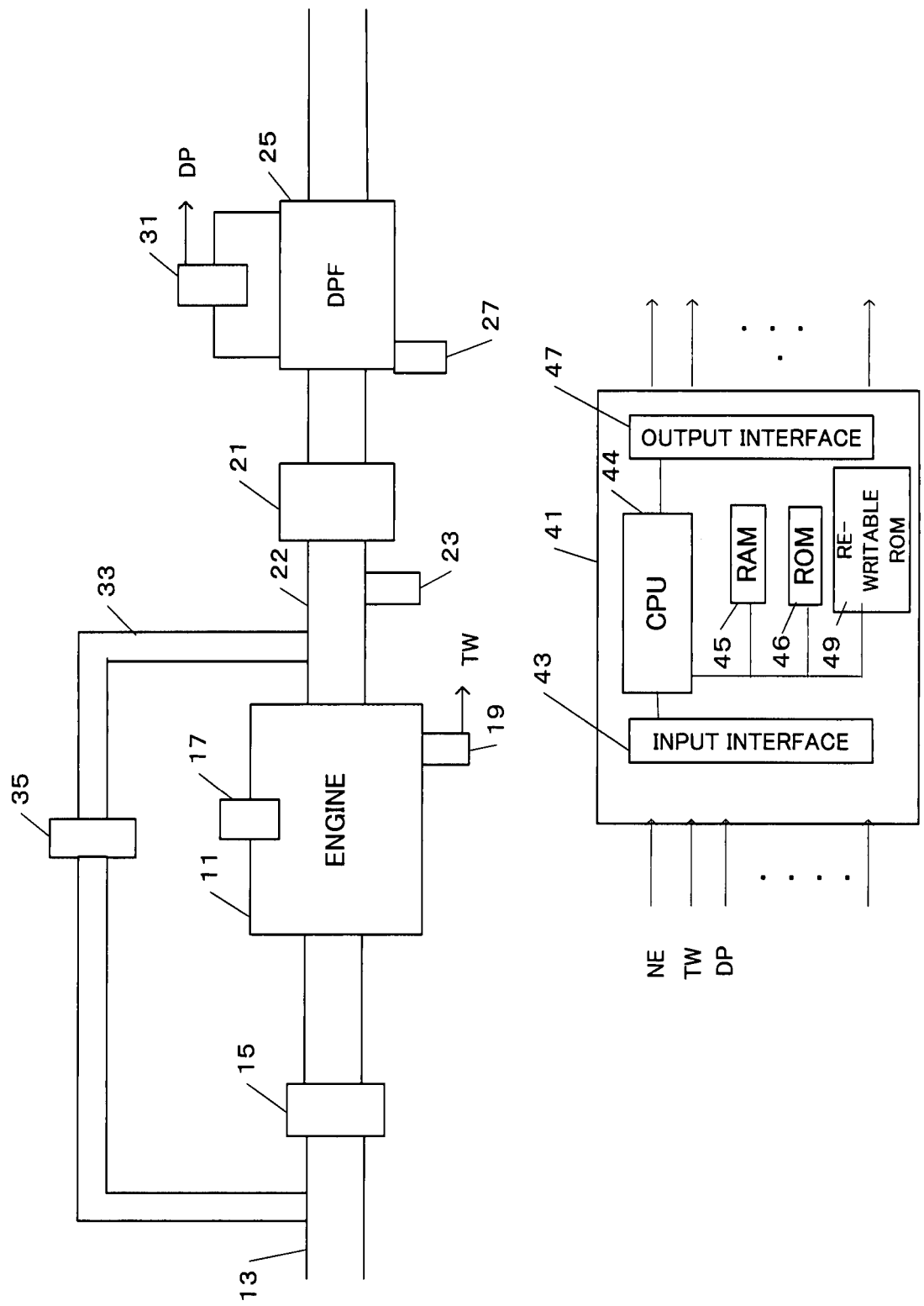
FIG. 1 is a block diagram showing an overall structure of a diesel engine as an example for applying the present invention.

Preferred embodiments of the present invention will be described below with reference to the accompanying drawings. FIG. 1 is a block diagram showing an overall structure of a system in which the present invention is applied to an exhaust system of a diesel engine. A fuel injecting device, that is, an injector 17, is provided in each cylinder of a diesel engine 11 and a water temperature sensor 19 for detecting a temperature TW of cooling water is disposed in a cylinder block. An exhaust gas recirculation (EGR) passage 33 is provided from an exhaust pipe 22 to an air intake pipe 13. An amount of EGR is controlled by an EGR controlling valve 35.

An oxidizing catalyst 21 and a diesel particulate filter (DPF) 25 are disposed in the exhaust pipe 22. The oxidizing catalyst 21 typically comprises a honeycomb-shaped medium of cordierite or heat resisting steel, whose surface is coated with activated alumina or the like. This coating layer contains catalyst-activating elements of precious metal such as platinum, palladium, rhodium or the like. The oxidizing catalyst serves to oxidize NO, HC, CO included in the exhaust gas to convert them into $NO_2$, $H_2$, and $CO_2$. The DPF 25 is a filter for collecting particulate maters (PM) contained in the exhaust gas. It consists of heat-resistant porous filtering walls of ceramics, nonwoven metal cloth or the like.

Sensor terminals of a pressure difference sensor 31 are placed at the entrance and the exit of the DPF 25, so that a sensor output signal indicating a difference DP between an exhaust gas pressure at the entrance and an exhaust gas pressure at the exit is sent to an electronic control unit (ECU) 41. The ECU 41 calculates an amount of accumulated particulate matters in the DPF based on an exhaust flow amount F and the pressure difference DP. When the amount of accumulated particulate matters exceeds a predetermined value, the ECU 41 performs a post-injection in an engine 11 in order to supply unburned fuel to the oxidizing catalyst 21. The supplied fuel burns at the oxidizing catalyst 21. Thus, exhaust gas of high temperature is sent to the DPF 25 to regenerate the DPF 25 by burning and dissipating the accumulated particulate matters. The term "post-injection" represents an additional fuel injection made in an expansion stroke or in an exhaust stroke after a primary injection has been made for generating engine power. The purpose of the post-injection is to raise the temperature of the exhaust gas by burning the fuel in the exhaust system.

The exhaust flow amount F can be calculated based on an intake air amount, an air intake pipe pressure or any other parameters. Since the calculation method is well known, detailed description is omitted.

The temperature of the exhaust gas of a diesel engine at a low load period is about 100 degrees centigrade plus several tens, which is very low in comparison with that of a gasoline engine. When the DPF is regenerated, the temperature of the exhaust gas is raised to the range of 500 to 600 degrees centigrade by oxidization and burning of the unburned fuel at the oxidizing catalyst 21. When the temperature becomes excessively high, the oxidizing catalyst 21 and the DPF 25 may deteriorate. A temperature sensor 23 is disposed at an entrance of the oxidizing catalyst 21 and another temperature sensor 27 is disposed at an entrance of the DPF 25 for monitoring the temperature of the exhaust gas. The temperature is controlled not to become excessively high. The sensor output may be used for performing various other controls.

Signals from various sensors are sent to the ECU 41. The ECU 41 calculates a required fuel injection amount Q based on the various input signals and sends driving signals to the injector. It also determines regeneration timing for the DPF 25 and sends control signals for post-injection to the injector.

The ECU 41 is basically a computer having an input interface 43, a CPU 44, a Random Access Memory 45 for providing a working space for calculations by the CPU 44 and providing a temporary storage for computer programs and data, a ROM 46 for storing programs and data, a re-writable memory 49 and an output interface 47. The re-writable memory 49 consists of an EEPROM (which is a re-writable ROM) or a backup RAM (which is a RAM for maintaining a storage capacity even at a time of power supply shortage because electric current is always supplied for a maintenance purpose). The re-writable memory 49 is used for storing the data to be updated in each operation cycle.

Figure 3:
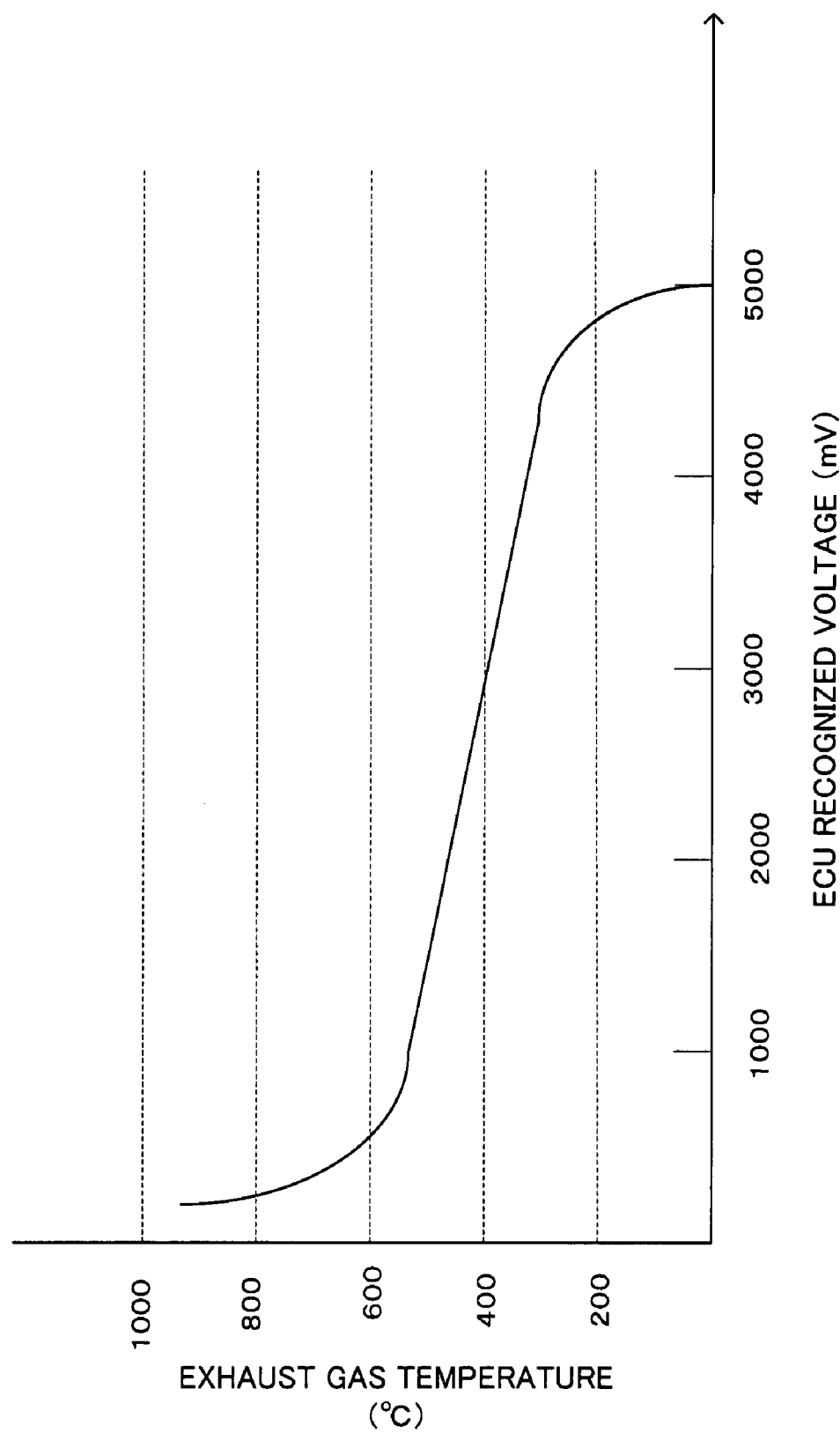
FIG. 3 is a graph showing an output characteristic of a temperature sensor.

FIG. 3 shows an output characteristic (a thermistor-like characteristic) of a temperature sensor used for a diesel engine in accordance with one embodiment of the present invention. This temperature sensor exhibits a high resistance and produces output voltage of about 5 V in the temperature range of 0 degrees centigrade to about 100 degrees centigrade plus several tens. When the temperature exceeds 140 degrees centigrade, electrical resistance of the sensor gradually becomes smaller and the sensor starts to produce smaller output voltage. At 500 degrees centigrade, the output voltage becomes about 1.3 V. Thus, even though an output of this temperature sensor is checked at a low temperature, it is difficult to distinguish whether the high resistance is caused by a failure such as breaking of electric wires or is due to the low temperature.

Although the temperature sensor having the above-described characteristic is used in this embodiment, it is possible to use another type of sensor having a reverse characteristic that the electrical resistance is lower in a lower temperature and higher in a higher temperature.

Figure 2:
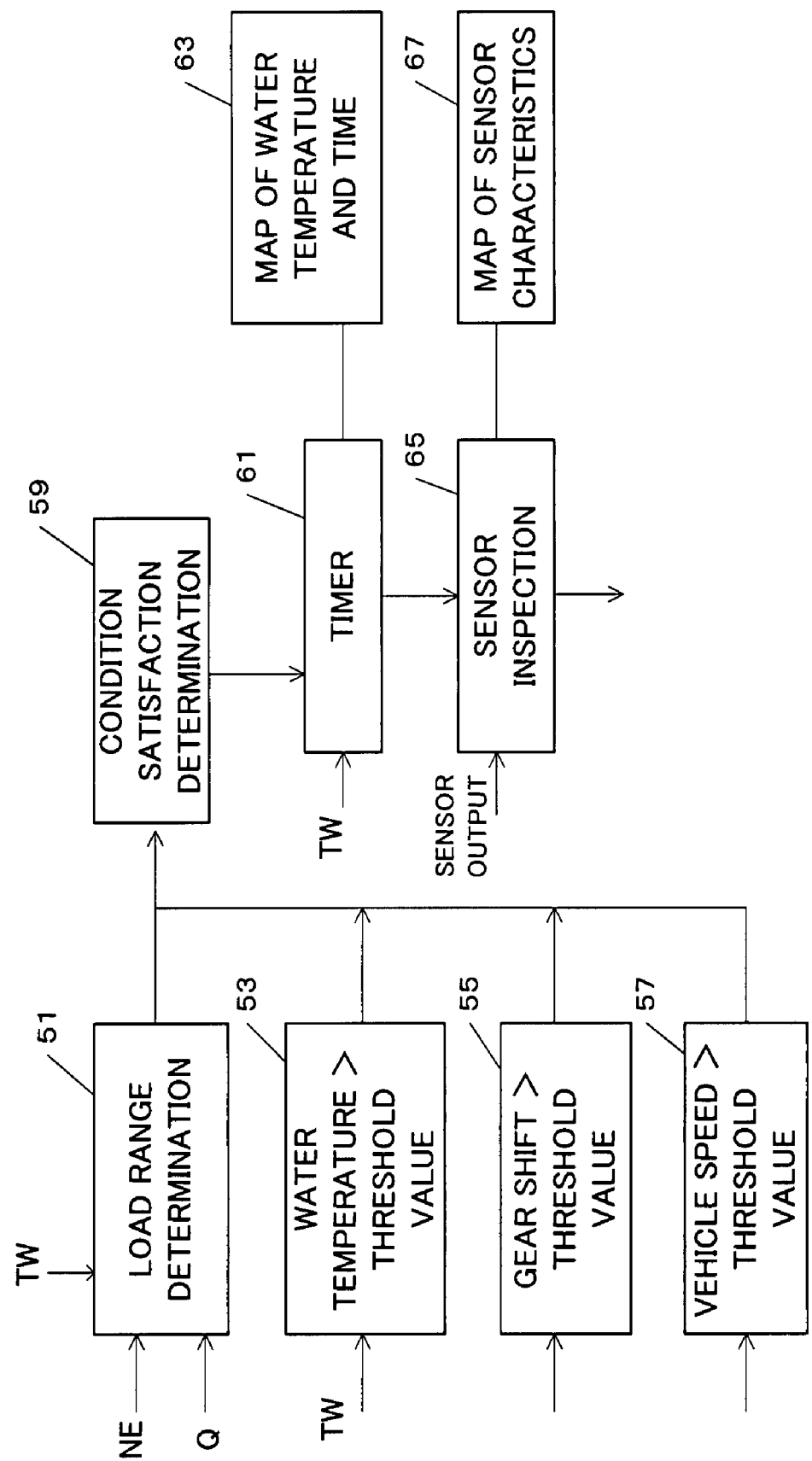
FIG. 2 is a block diagram of a temperature sensor inspecting apparatus in accordance with one embodiment of the present invention.

FIG. 2 illustrates functional blocks of a program that is performed by the ECU 41 in accordance with one embodiment of the present invention. A load range determining unit 51 selects in accordance with the engine water temperature an engine load range to be used as a reference for selecting a map to be described hereafter. Unit 51 determines whether or not a current engine load determined based on an engine rotational speed NE and a fuel injection amount Q is in the selected load range.

The engine load can be classified into, for example, a low load range, a medium load range and a high load range. The determination unit 51 selects one of these ranges according to the engine water temperature. The higher the engine water temperature is, a lower range is selected for use. For example, the determination unit 51 selects the high load range when the engine water temperature is equal to or lower than 0 degrees centigrade. The medium load range is selected when the temperature is higher than 0 degrees centigrade and lower than 60 degrees centigrade. The low load range is selected when the temperature is equal to or higher than 60 degrees centigrade.

Figure 4:
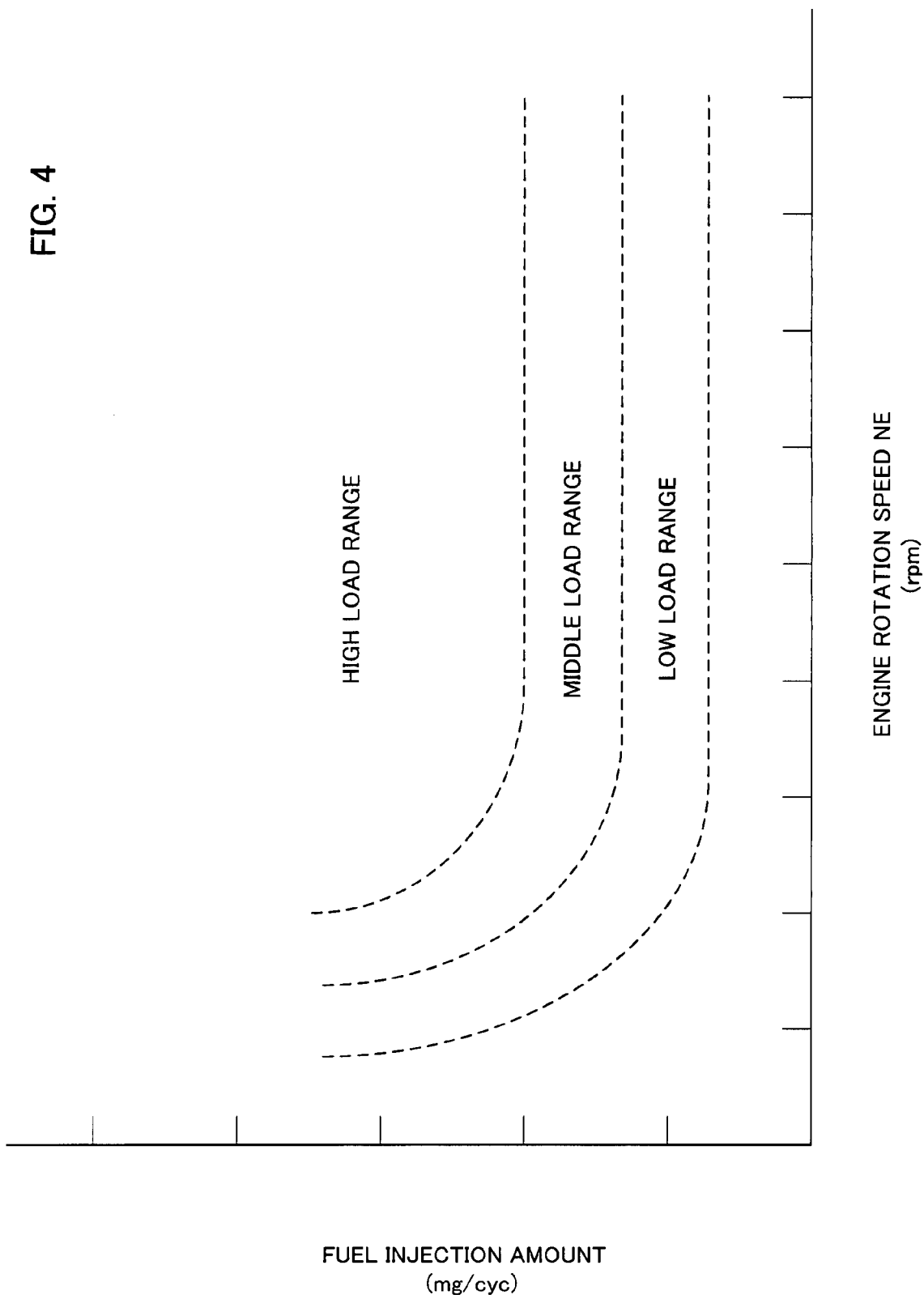
FIG. 4 is a graph showing a high load range in accordance with one embodiment of the present invention.

FIG. 4 illustrates load ranges according to engine speed (number of revolutions) NE and fuel injection amount Q. The load range determining unit 51 determines a current load based on NE and Q according to a map (stored in ROM 46) which is equivalent to the chart illustrated in FIG. 4 and determines if the current engine load is in the selected load range or in a higher range. The determination unit 51 sends a determination signal to a condition satisfaction determining unit 59.

When the engine operates in a higher load range, the temperature of the exhaust gas exceeds, for example, 200 degrees centigrade, whereby the output of the temperature sensor exhibit some change. Thus, this range is appropriate for inspecting the behavior of the sensor. When the engine water temperature is high, for example, after a vehicle is used, the exhaust gas temperature may be appropriate for inspecting the temperature sensor even though the engine load is not in the high load range. Therefore, the engine load range for permitting inspection (a monitor condition) can be selected according to the engine water temperature. A detection frequency may be increased by assuming and setting that the monitor condition is satisfied in a lower load condition (the lower engine rotational speed and the smaller fuel injection amount) the higher the engine water temperature is.

A water temperature determining unit 53 determines whether or not the engine water temperature TW that is detected by the temperature sensor 19 is higher than a predetermined value, which is minus 7 degrees centigrade for example. When the engine water temperature TW is excessively low, the inspection of the water temperature sensor is prohibited because a rather long time is needed before the temperature of the exhaust system becomes sufficiently high.

A gear shift determining unit 55 determines whether or not the current gear shift position is equal to or higher than a predetermined shift position, which is the third shift for example. In this embodiment, the gear shift state is included in the conditions for executing the inspection because the temperature sensor needs to be checked under a high load and stable condition.

A vehicle speed determining unit 57 determines whether or not a vehicle speed is equal to or higher than a predetermined value, which is 20 km per hour for example. When the vehicle speed is lower than this value, the inspection of the temperature sensor is prohibited. This condition is required for the inspection of the temperature sensor to be performed under a high load and stable condition.

Figure 5:
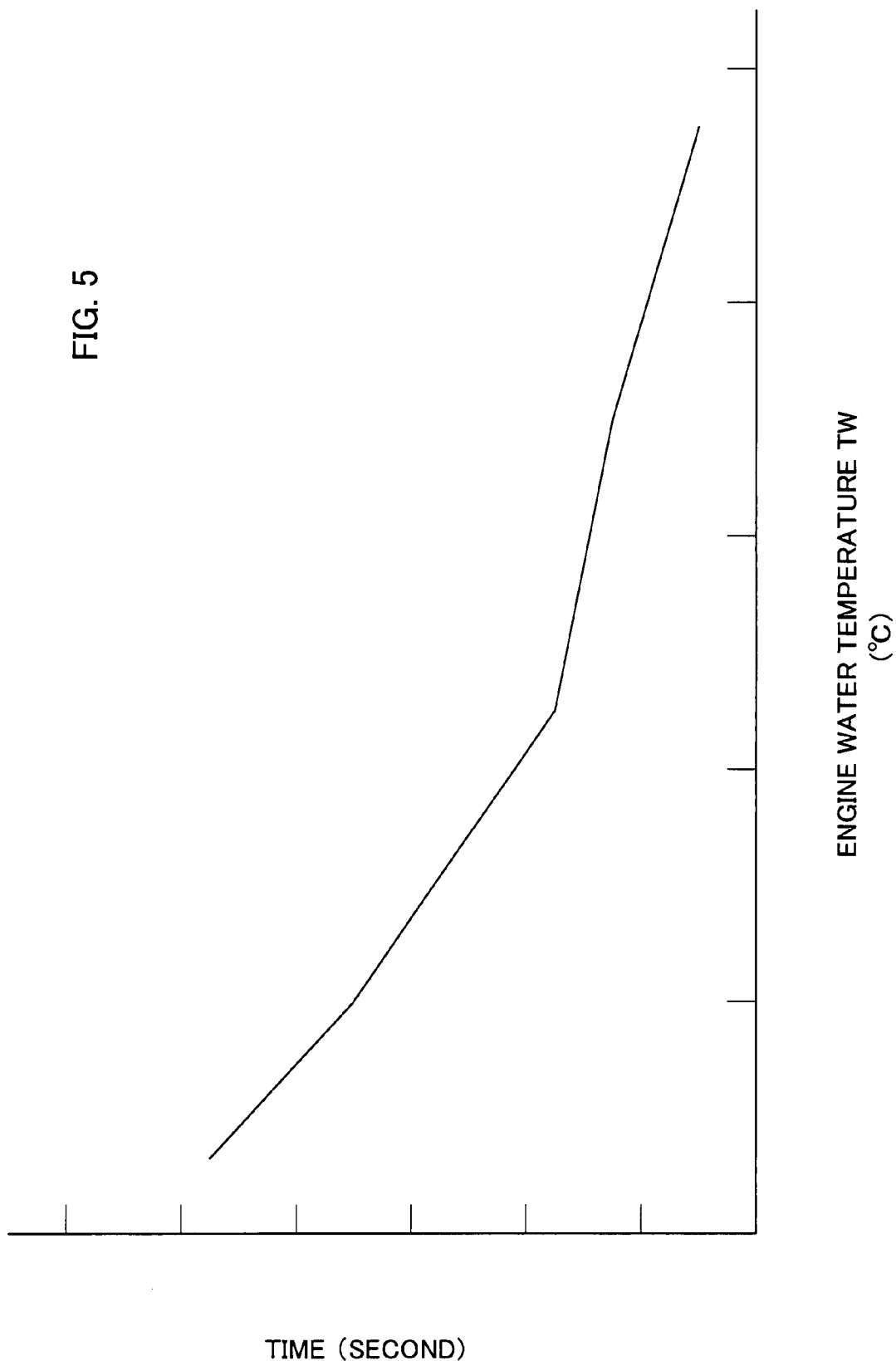
FIG. 5 is a graph showing a relation between an engine water temperature and a time period in which a satisfied inspection condition should continue in accordance with one embodiment of the present invention.

When all of the above-described conditions are satisfied, the condition satisfaction determining unit 59 sends a signal indicating satisfaction of the conditions to a timer unit 61. The timer unit 61 refers to a map (stored in ROM 46) of the water temperature and the time to set a timer. When the set time period is elapsed with the satisfied determination condition, the timer unit sends a signal indicating permission for the inspection of the temperature sensor to a sensor inspecting unit 65. FIG. 5 illustrates a map of the water temperature and the time period corresponding to the high load state. The horizontal axis of the map represents the engine water temperature TW and the vertical axis represents the time period needed for the temperature of the exhaust system to reach a temperature of about 140 degrees centigrade. For example, when the engine water temperature is 60 degrees centigrade, a time period of about 60 seconds is required for the temperature of the exhaust system to reach the temperature of about 140 degrees centigrade. Thus, the timer unit 61 sets a waiting time in accordance with the engine water temperature TW and then outputs a sensor inspection permitting signal when the determination conditions are satisfied over the set waiting time.

It should be noted that multiple maps corresponding to each of the load ranges may be prepared as map 63 of the water temperature and the time. A map for setting the timer may be selected from the multiple ones based on the load condition as determined by the engine rotational speed and the fuel injection amount.

The sensor inspecting unit 65 refers to the map 67 of the sensor characteristics as illustrated in FIG. 3 responsive to the sensor inspection permitting signal to check the behavior of the temperature sensor. Specifically, when the temperature sensor produces a lower voltage output than 4900 mV corresponding to the temperature that is equal to or higher than 140 degrees centigrade, the unit 65 determines that the temperature sensor is normal. When the sensor produces a voltage output of 5000 mV, the unit 65 determines that the temperature sensor is abnormal.

Thus, normality/abnormality of the temperature sensor can be determined accurately because the inspection of the temperature sensor is performed by obtaining and utilizing a timing needed for the temperature of the exhaust system to reach the temperature that is appropriate for inspecting the temperature sensor.

Although the present invention has been described above with reference to the specific embodiment, the present invention is not limited such specific embodiment. For example, the present invention can be applied to an upright type of engine such as an outboard motor or the like.

What is claimed is:

1. An apparatus for inspecting a temperature sensor disposed in an exhaust system of an engine, the apparatus comprising:
    means for determining that conditions for inspecting the temperature sensor are satisfied in the current engine condition;
    a timer means for determining the time when the temperature in the exhaust system reaches a value appropriate for checking the temperature sensor; and
    means for checking the output of the temperature sensor to determine if the temperature sensor is normal when said time elapsed.

2. The apparatus as claimed in claim 1, further comprising:
    means for selecting a load range from a plurality of load ranges according to the engine water temperature, wherein a higher load range is selected the lower the engine water temperature is.

3. The apparatus as claimed in claim 2, wherein a high load range is selected when the engine water temperature is lower than a first predetermined value, a medium load range is selected when the engine water temperature is higher than the first predetermined value and lower than the second predetermined value, and a low load range is selected when the engine water temperature is higher than the second predetermined value.

4. The apparatus as claimed in claim 2, wherein said timer means determines said time in accordance with the engine water temperature and the selected load range.

5. The apparatus as claimed in claim 4, wherein said timer means includes a plurality of maps of engine water temperature and time, each map corresponding one of the plurality of load ranges.

6. The apparatus as claimed in claim 5, further comprising:
    means for determining the current engine load based on at least one of engine revolution speed and amount of fuel injection.

7. The apparatus as claimed in claim 6, wherein said engine is a diesel engine and the temperature sensor disposed in the exhaust system includes at least one of a temperature sensor placed upstream of an oxidizing catalyst and a temperature sensor placed at an entrance of a diesel particulate filter.

8. A method for inspecting a temperature sensor disposed in an exhaust system of an engine, comprising:
    determining that conditions for inspecting the temperature sensor are satisfied in the current engine condition;
    determining the time when the temperature in the exhaust system reaches a value appropriate for checking the temperature sensor; and
    checking the output of the temperature sensor to determine if the temperature sensor is normal when said time elapsed.

9. The method as claimed in claim 8, further comprising:
    selecting a load range from a plurality of load ranges according to the engine water temperature, wherein a higher load range is selected the lower the engine water temperature is.

10. The method as claimed in claim 9, wherein a high load range is selected when the engine water temperature is lower than a first predetermined value, a medium load range is selected when the engine water temperature is higher than the first predetermined value and lower than the second predetermined value, and a low load range is selected when the engine water temperature is higher than the second predetermined value.

11. The method as claimed in claim 9, wherein said time is determined in accordance with engine water temperature and the selected load range.

12. The method as claimed in claim 11, wherein said time is determined referring to one a plurality of maps of engine water temperature and time, each map corresponding to the plurality of load ranges.

13. The method as claimed in claim 12, further comprising:
    determining said current engine load range based on at least one of engine revolution speed, amount of fuel injection and the engine water temperature.

* * * * *